Patented Mar. 15, 1932

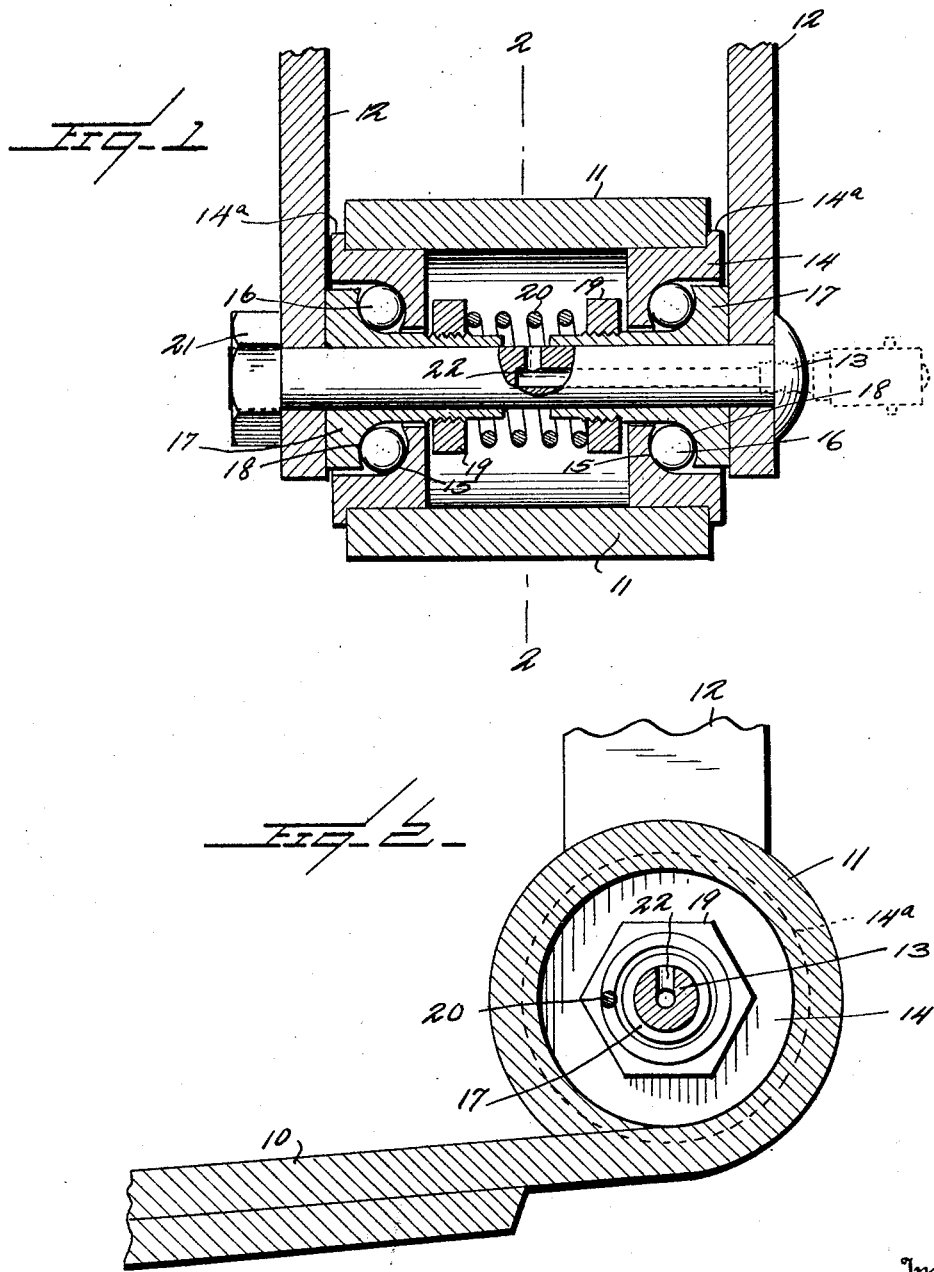

1,849,579

UNITED STATES PATENT OFFICE

WARREN KEMMERLING, OF HITCHCOCK, TEXAS

SPRING SHACKLE

Application filed March 23, 1929. Serial No. 349,458.

This invention relates to improvements in devices for shackling automobile springs and like parts and the general object of the invention is to provide a shackle or bearing for vehicle springs which will permit free play of the spring with a minimum of friction, which may be readily oiled and which will prevent rattling or squeaking of the parts.

A further object is to provide a spring shackle of this character which may be readily taken up at any time and in which a coiled compression spring keeps a constant yielding tension upon the parts.

A further object is to provide a spring shackle of this character which is so constructed that it may be readily assembled at a bench and then taken to the automobile assembling room in boxes or baskets, the construction being such as to permit the bearing to be readily taken apart with very little trouble where a broken ball or injured race is to be repaired.

Other objects will appear in the course of the following description.

My invention is illustrated in the accompanying drawings, wherein:—

Figure 1 is a transverse sectional view through a spring shackle constructed in accordance with my invention;

Figure 2 is a section on the line 2—2 of Figure 1, the links being shown in elevation.

Referring to these drawings, 10 designates a vehicle spring or like element formed at its end with the usual eye 11. 12 designates the usual opposed shackle plates or hangers provided for the passage of a bolt 13. Disposed within the eye 11 at opposite ends thereof is an outer bearing 14, this bearing being formed at it outer end with a projecting shoulder or flange 14ª adapted to bear against the end face of the spring eye 11. The inner face of the annular bearing 14 is formed to provide a centrally projecting race 15 coacting with the anti-friction elements which are preferably in the form of balls and designated 16.

Fitting within the annular outer bearing 14 is an inner bearing 17 which is also annular in cross section to permit the passage of the bolt 13 and which is formed with the race 18 coacting with the balls 16. The inner bearing projects beyond this race and through the central opening of the outer bearing and is screw-threaded for the reception of the lock nut 19. Preferably, though I do not wish to be limited to this, a coiled compression spring 20 is disposed around the inner or confronting ends of the inner bearings 17 and this spring bears at its opposite ends against the lock nuts 19. The bolt 13 is, of course, provided at one end with a head and at its opposite end with nut 21.

It will be seen that with this construction, the spring is supported in spaced relation to the bolt 13 by anti-friction balls and two bearing members and thus there is perfect freedom of movement concentrically to the axis of the bolt between the spring and the bolt. It will be seen that a bearing of this kind is readily adjustable, that it can be tightened to take any play and wear, that it is readily oiled and it is relatively simple in construction.

I have illustrated the bolt 13 as being provided with the longitudinally extending passage 21 having screw-threads at its outer end whereby it may be connected to an alemite or grease cup shown in dotted lines in Figure 1, this passage discharging into the interior of the bearing. The inner bearing members 17 also may be connected readily to or form a part of the members 12 and still be within the purview of this invention. This would tend to prevent any side wobble and make the bearings more rigid. It will be obvious that this would in no way involve any departure from my invention as it would merely consist of making the two parts in one instead of making them separately.

While I have illustrated this device as applied to a spring shackle, I do not wish to be limited thereto as it is obvious that other parts of an automobile might be supported in the same manner without departing from the spirit of the invention as defined in the appended claims.

As before stated, one of the objects of this invention is to provide a bearing which can be asembled at a bench and then taken in its assembled condition to the automobile assembling room in boxes or baskets. When ready to assemble the parts, the bearing member 17 is stood on end on the bench and balls are placed within the race of the bearing member which is sufficiently cupped or concave so that the balls will not roll off. Then the outer bearing 14 is placed on top of the ball 16, then the nut 19 is screwed into place and thus a complete bearing is formed which can be placed in a basket or box and carried in the assembly room ready for the assembly of the body to the automobile through the spring connections. With the two bearings assembled, as desired, a shackle plate is placed in position and then the bolt 13 inserted through the two bearings and the nut 21 turned home. While I do not wish to be limited to the use of the coil spring 20, this spring aids in adjusting the bearings and keeping the whole rigid. A shackle plate is placed in position and then the bolt 12 inserted and when the nut 21 is secured upon the bolt 13, no play is left. The coil spring between the two bearings aids in adjusting the bearings and keeping the whole rigid. I do not wish to be limited to the use of this spring, however.

It will be seen that my improved bearing eliminates friction, strain, squeak and does away with the necessity of frequent greasing and because of the easy working springs it makes for easier riding. The construction is very simple, requires no radical changes to be made in any of the parts and the structure can be assembled or attached to the car by anyone with ordinary mechanical ability. It is easy to adjust and repair and easy to disassemble and replace the balls or anti-friction elements in case it becomes necessary to do so. It will not become necessary to grease the spring shackle more than once a year.

I claim:—

1. In a device of the character described, an element having an eye, members disposed at each end of the eye, a bolt passing through said members and centrally through the eye, outer annular bearings disposed at each end of the eye and extending thereinto and having ball races upon their centrally disposed faces, inner annular bearings extending through the outer bearings and through which said bolt passes and each having a ball race confronting the ball race in the outer bearing, anti-friction elements disposed between said races, nuts engaging the inner bearings and confronting the inner end faces of the outer bearings, and a coiled compression spring surrounding the inner confronting ends of the inner bearings, the ends of the spring bearing against said last named nuts.

2. In a spring shackle of the character described, a spring having an eye, shackle plates disposed at each end of the eye, a shackle bolt passing through the plates and through the center of said eye and carrying a nut, inner annular bearings mounted upon said bolts adjacent the shackle plates and formed to provide transversely concave ball races, outer bearings extending into said eye and having shoulders bearing against the end faces of the eye, the inner faces of the outer bearings being formed with ball races, anti-friction balls disposed between the two races, nuts engaging the inner bearings and confronting the inner ends of the outer bearings, and a coiled compression spring surrounding the inner ends of the inner bearings and at its ends bearing against said nuts.

In testimony whereof I hereunto affix my signature.

WARREN KEMMERLING.